United States Patent
Chen et al.

(10) Patent No.: US 11,422,406 B2
(45) Date of Patent: Aug. 23, 2022

(54) BACKLIGHT MODULE

(71) Applicant: Innolux Corporation, Miao-Li County (TW)

(72) Inventors: Ming-Huang Chen, Miao-Li County (TW); I-An Yao, Miao-Li County (TW); Ya-Ling Chen, Miao-Li County (TW); Chuan-Chi Chien, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/398,018

(22) Filed: Aug. 10, 2021

(65) Prior Publication Data

US 2022/0066265 A1    Mar. 3, 2022

(30) Foreign Application Priority Data

Sep. 3, 2020    (CN) .......................... 202010914413.6

(51) Int. Cl.
*G02F 1/13357* (2006.01)

(52) U.S. Cl.
CPC .. *G02F 1/133603* (2013.01); *G02F 1/133605* (2013.01); *G02F 1/133606* (2013.01)

(58) Field of Classification Search
None
See application file for complete search history.

(56) References Cited

U.S. PATENT DOCUMENTS

2021/0333633 A1* 10/2021 Mei .......................... G02B 6/00
2021/0382226 A1* 12/2021 Zha ........................ G02F 1/1334

FOREIGN PATENT DOCUMENTS

| CN | 209707851 | 11/2019 |
|----|-----------|---------|
| CN | 209707863 | 11/2019 |
| CN | 209707871 | 11/2019 |
| CN | 209707872 | 11/2019 |

* cited by examiner

*Primary Examiner* — Britt D Hanley
(74) *Attorney, Agent, or Firm* — JCIPRNET (57) ABSTRACT

A backlight module is provided. The backlight module is used for a display panel having a camera region. The backlight module may be operated in display mode or camera mode. The backlight module includes multiple light emitting units. When the backlight module is operating in the display mode, the light emitting units are all turned on. When the backlight module is operating in the camera mode, a portion of the light emitting units corresponding to the camera region of the display panel is turned off, and another portion of the light emitting units is turned on.

12 Claims, 6 Drawing Sheets

BACKLIGHT MODULE

CROSS-REFERENCE TO RELATED APPLICATION

This application claims the priority benefit of China application serial no. 202010914413.6, filed on Sep. 3, 2020. The entirety of the above-mentioned patent application is hereby incorporated by reference herein and made a part of this specification.

BACKGROUND

Technical Field

The disclosure relates to an electronic device, and more particularly to a backlight module.

Description of Related Art

In order to achieve full-screen display, some technologies propose to hide the camera under the display panel and the backlight module in the display device. However, under such architecture, the image beam from the captured object must pass through the display panel and the backlight module to be received by the camera, but certain elements or films in the backlight module may affect the transmission of the image beam, thereby affecting image capturing quality. Therefore, how to meet the requirements of the display mode and the camera mode at the same time has become one of the issues that researchers in the art urgently intend to solve.

SUMMARY

The disclosure provides a backlight module, which helps to reduce negative influence of the backlight module on image capturing quality.

According to an embodiment of the disclosure, the backlight module is used for a display panel having a camera region. The backlight module can be operating in a display mode or a camera mode. The backlight module includes multiple light emitting units. When the backlight module is operating in the display mode, the light emitting units are all turned on. When the backlight module is operating in the camera mode, a portion of the light emitting units corresponding to the camera region of the display panel is turned off, and another portion of the light emitting units is turned on.

For the features and advantages of the disclosure to be more comprehensible, the following specific embodiments are described in detail in conjunction with the accompanying drawings.

BRIEF DESCRIPTION OF THE DRAWINGS

The accompanying drawings are included to provide a further understanding of the invention, and are incorporated in and constitute a portion of this specification. The drawings illustrate embodiments of the invention and, together with the description, serve to explain the principles of the invention.

DETAILED DESCRIPTION OF DISCLOSED EMBODIMENTS

The disclosure may be understood by referring to the following detailed description in conjunction with the accompanying drawings. It should be noted that in order to facilitate the understanding by the reader and the conciseness of the drawings, multiple drawings in the disclosure only depict a portion of the electronic device/display device, and specific elements in the drawings are not drawn according to actual scale. In addition, the number and size of each element in the drawings are only for illustration and are not intended to limit the scope of the disclosure. For example, for the sake of clarity, the relative size, thickness, and position of each film, region, or structure may be reduced or enlarged.

Throughout the disclosure and the appended claims, certain words are used to refer to specific elements. Persons skilled in the art should understand that electronic device manufacturers may refer to the same elements by different names. The disclosure does not intend to distinguish the elements with the same function but different names. In the following description and claims, words such as "have" and "include" are open-ended words, which should be interpreted as "including but not limited to . . . ".

The directional terms such as "upper", "lower", "front", "rear", "left", and "right" mentioned in the disclosure are only the directions with reference to the drawings. Therefore, the directional terms used are used to illustrate, but not to limit the disclosure. It should be understood that when an element or a film is referred to as being "on" or "connected to" another element or film, the element or film may be directly on the another element or film or directly connected to the another element or film, or there may be an intervening element or film between the two (indirect case). Conversely, when an element or film is referred to as being "directly on" or "directly connected to" another element or film, there is no intervening element or film between the two.

The terms "approximately", "equal to", "equal", "same", "substantially", or "substantially" mentioned in the disclosure usually represent falling within a 10% range of a given value or range, or represent falling within a 5%, 3%, 2%, 1%, or 0.5% range of a given value or range. In addition, the terms "a given range is from a first value to a second value" and "a given range falls within a range of a first value to a second value" represent that the given range includes the first value, the second value, and other values in between.

In some embodiments of the disclosure, unless specifically defined, terms related to bonding and connection, such as "connection" and "interconnection", may mean that two structures are in direct contact, or that two structures are not in direct contact and there is another structure disposed between the two structures. The terms related to bonding and connection may also include the case where the two structures are both movable or both fixed. In addition, the terms "electrical connection" and "coupling" include any direct and indirect electrical connection means.

In addition, terms such as "first" and "second" mentioned in the specification or claims are only used to name different elements or to distinguish different embodiments or ranges, and are not used to limit the upper or lower limit of the number of elements or to limit the manufacturing sequence or arrangement sequence of the elements.

An electronic device of the disclosure may include a display device, an antenna device, a sensing device, a light emitting device, or a splicing device, but not limited thereto. The electronic device may include a bendable or flexible electronic device. The electronic device may, for example, include a liquid crystal layer or a light emitting diode (LED). The light emitting diode may include, for example, an organic LED (OLED), a mini LED, a micro LED, a quantum dot LED (QLED or QDLED), fluorescence, phosphor, other suitable materials, or a combination of the above, but not limited thereto. Hereinafter, the display device will serve as the electronic device to illustrate the content of the disclosure, but the disclosure is not limited thereto.

The display device of the disclosure may be a non-self-luminous display device. The non-self-luminous display device may include a liquid crystal display device, but not limited thereto. The liquid crystal display device may include a display panel, a backlight module, a camera, and a casing, but not limited thereto. Hereinafter, the liquid crystal display device will serve as the display device to illustrate the content of the disclosure, but the disclosure is not limited thereto.

Figure 1:
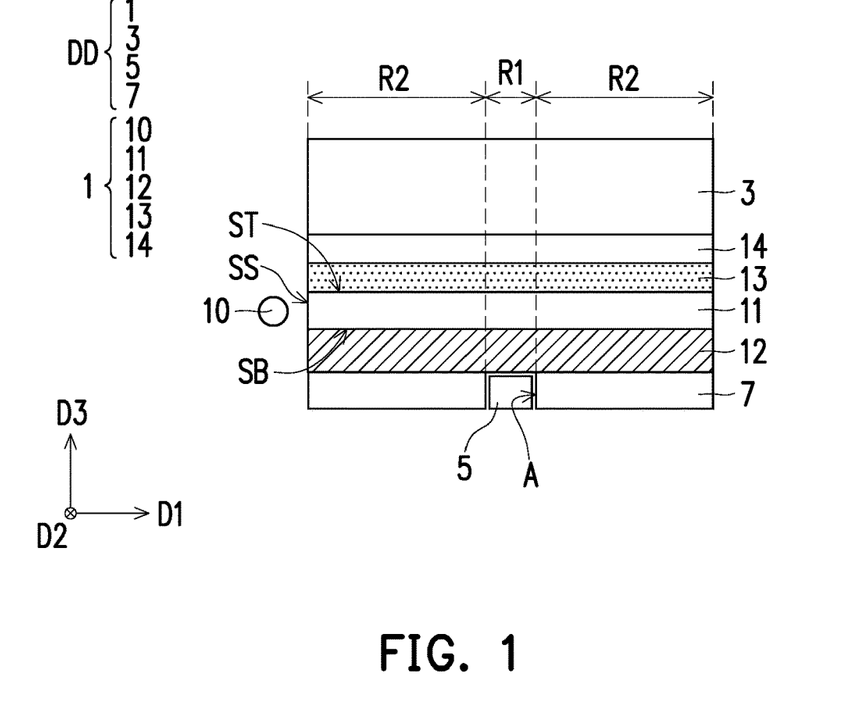
FIG. 1 is a schematic cross-sectional view of a backlight module according to a first embodiment of the disclosure.

FIG. 1 is a schematic cross-sectional view of a backlight module according to a first embodiment of the disclosure. In addition to a backlight module 1, FIG. 1 also shows a display panel 3, a camera 5, and a casing 7 to facilitate understanding of the relative configuration relationship of elements in a display device DD.

Please refer to FIG. 1. The display device DD may include the backlight module 1, the display panel 3, the camera 5, and the casing 7, but not limited thereto. The display panel 3 is disposed on the backlight module 1. The casing 7 is disposed under the backlight module 1, and the casing 7 has an opening A for accommodating the camera 5. The camera 5 is disposed in the opening A of the casing 7.

The display panel 3 may have a camera region R1 and a display region R2. The camera region R1 corresponds to the camera 5. For example, the camera region R1 overlaps with the camera 5 in a thickness direction (for example, a third direction D3) of the display device DD.

The display device DD may have a display mode and a camera mode. In the display mode, the display device DD provides a display function. For example, the camera region R1 and the display region R2 may jointly provide a display screen. In the camera mode, the display device DD provides a photographing function. For example, the camera 5 receives an image beam passing through the camera region R1 of the display panel 3 and the backlight module 1, so as to obtain an image corresponding to a captured object. According to different requirements, the display device DD may also display images in the camera mode. For example, while the camera 5 acquires the image corresponding to the captured object, the display device DD may display the acquired image in at least portion of the display region R2, but not limited thereto.

The backlight module 1 can operate in the display mode or the camera mode. In detail, the backlight module 1 may include multiple light emitting units 10 (only one light emitting unit 10 is schematically shown in FIG. 1). The light emitting unit 10 may include a light emitting diode, an organic light emitting diode, a mini light emitting diode, a micro light emitting diode, or a quantum dot light emitting diode.

In some embodiments, as shown in FIG. 1, the backlight module 1 may be an edge-type backlight module. For example, in addition to the light emitting units 10, the backlight module 1 may also include a light guide plate 11, a tunable reflector 12, a tunable diffuser 13, and an optical element layer 14, but not limited thereto.

The material of the light guide plate 11 may include plastic, glass, or any material suitable for transmitting light. The light guide plate 11 includes a top surface ST, a bottom surface SB, and a side surface SS. The bottom surface SB is opposite to the top surface ST, and the side surface SS connects the bottom surface SB and the top surface ST. The light emitting units 10 are disposed adjacent to the side surface SS. In some embodiments, the light emitting units 10 may be arranged in a second direction D2 and emit light toward the side surface SS. The light emitted by the light emitting units 10 may enter the light guide plate 11 via the side surface SS and may be transmitted into the light guide plate 11 in a manner of total internal reflection (TIR).

According to different requirements, at least one of the top surface ST and the bottom surface SB of the light guide plate 11 may be formed with a microstructure or dots. In another embodiment, a microstructure or dots may be disposed on at least one of the top surface ST and the bottom surface SB of the light guide plate 11. For example, the dots (not shown) disposed on the bottom surface SB of the light guide plate 11 may destroy total internal reflection, so that the light is emitted from the top surface ST of the light guide plate 11. Regarding design parameters (for example, material, manufacturing manner, distribution manner, shape, size, etc.) of the microstructure or the dots, please refer to the existing design, which will not be repeated here.

The tunable reflector 12 is disposed on the bottom surface SB of the light guide plate 11. The tunable reflector 12 is, for example, an electronically controlled reflectance element, which may be switched between a transparent state and a reflective state through voltage control. For example, the tunable reflector 12 may include two light-transmitting substrates, two conductive layers, and cholesteric liquid crystal (CLC). The two light-transmitting substrates are disposed opposite to each other. The two conductive layers are respectively disposed on the two light-transmitting substrates and face each other. The cholesteric liquid crystal is disposed between the two conductive layers.

At least one of the two conductive layers may be a patterned light-transmitting electrode layer. In some embodiments, the two conductive layers are both partially patterned. A portion of an electrode pattern overlapping with the camera region R1 and another portion of an electrode pattern overlapping with the display region R2 in the patterned light-transmitting electrode layer may be separated from each other to be able to independently control the state of the cholesteric liquid crystal corresponding to the camera region R1 and the display region R2 or independently control the state of the tunable reflector 12 overlapping with the camera region R1 and the tunable reflector 12 overlapping with the display region R2.

When the backlight module 1 is operating in the display mode, a portion of the tunable reflector 12 overlapping with the camera region R1 and another portion of the tunable reflector 12 overlapping with the display region R2 may both be in the reflective state through electrically controlling the tunable reflector 12. In this way, the tunable reflector 12 as a whole may be used to reflect the light directed to the tunable reflector 12, so that more light can be emitted from the display panel 3, thereby increasing the brightness of the image in the camera region R1 and the display region R2.

When the backlight module 1 is operating in the camera mode, a portion of the tunable reflector 12 overlapping with the camera region R1 may be in the transparent state through electrically controlling the tunable reflector 12, so that the image beam can pass through the portion of the tunable reflector 12 overlapping with the camera region R1 to be transmitted to the camera 5. On the other hand, when the backlight module 1 is operating in the camera mode, another portion of the tunable reflector 12 overlapping with the display region R2 may be in the reflective state through electrically controlling the tunable reflector 12. In this way, the another portion of the tunable reflector 12 overlapping with the display region R2 may be used to reflect the light, so that more light can be emitted from the display region R2 of the display panel 3, thereby increasing the brightness of the image in the display region R2 in the camera mode.

The tunable diffuser 13 is disposed on the top surface ST of the light guide plate 11. The tunable diffuser 13 is, for example, an electronically controlled reflectance element, which switches between a transparent state and a scattered state through voltage control. For example, the tunable diffuser 13 may include two light-transmitting substrates, two conductive layers, and polymer dispersed liquid crystal (PDLC). The two light-transmitting substrates are disposed opposite to each other. The two conductive layers are respectively disposed on the two light-transmitting substrates and face each other. The polymer dispersed liquid crystal is disposed between the two conductive layers.

At least one of the two conductive layers may be a patterned light-transmitting electrode layer. A portion of an electrode pattern overlapping with the camera region R1 and another portion of an electrode pattern overlapping with the display region R2 in the patterned light-transmitting electrode layer may be separated from each other to be able to independently control the state of the polymer dispersed liquid crystal corresponding to the camera region R1 and the display region R2 or independently control the state of the portion of the tunable diffuser 13 overlapping with the camera region R1 and the another portion of the tunable diffuser 13 overlapping with the display region R2.

When the backlight module 1 is operating in the display mode, a portion of the tunable diffuser 13 overlapping with the camera region R1 and another portion of the tunable diffuser 13 overlapping with the display region R2 may both be in the scattered state through electrically controlling the tunable diffuser 13 to improve the uniformity of light.

When the backlight module 1 is operating in the camera mode, a portion of the tunable diffuser 13 overlapping with the camera region R1 may be in the transparent state through voltage control, so that the image beam can pass through the portion of the tunable diffuser 13 overlapping with the camera region R1 to be transmitted to the camera 5. On the other hand, when the backlight module 1 is operating in the camera mode, another portion of the tunable diffuser 13 overlapping with the display region R2 may be in the scattered state through electrically controlling the tunable diffuser 13. In this way, the another portion of the tunable diffuser 13 overlapping with the display region R2 may be used to scatter the light, so that in the camera mode, the light directed to the display region R2 is more uniform.

The optical element layer 14 is disposed on the tunable diffuser 13 and is located between the tunable diffuser 13 and the display panel 3. The optical element layer 14 may be used to control light parameters (for example, angle, polarization direction, transmittance, reflectivity, etc.). For example, the optical element layer 14 may include a multilayer optical film or a micro lens array, but not limited thereto. The multilayer optical film may include multiple low refractive index layers and multiple high refractive index layers, and the low refractive index layers and the high refractive index layers may be alternately arranged in a third direction D3.

Figure 2A:
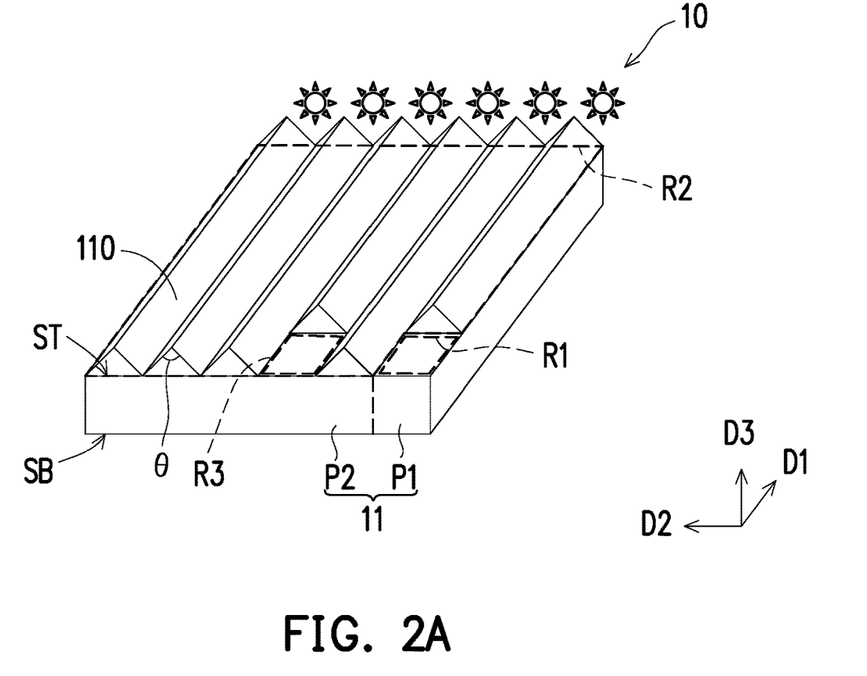
FIG. 2A is a three-dimensional schematic view of a light guide plate and multiple light emitting units in a display mode according to the disclosure.
Figure 2B:
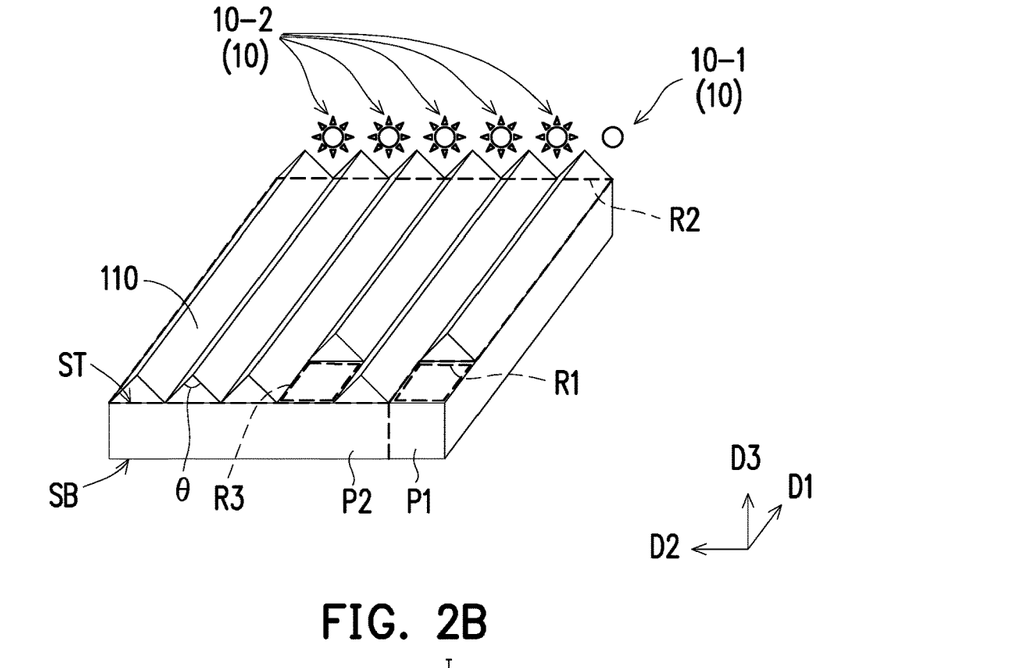
FIG. 2B is a three-dimensional schematic view of the light guide plate and the light emitting units in a camera mode according to the disclosure.

FIG. 2A is a three-dimensional schematic view of a light guide plate and multiple light emitting units in a display mode according to the disclosure. FIG. 2B is a three-dimensional schematic view of the light guide plate and the light emitting units in a camera mode according to the disclosure. The light guide plate and the light emitting units shown in FIG. 2A and FIG. 2B may be applied to the embodiment of FIG. 1.

Please refer to FIG. 2A. When the backlight module is operating in the display mode, the light emitting units 10 are all turned on. Please refer to FIG. 2B, when the backlight module is operating in the camera mode, a portion (for example, a light emitting unit 10-1) of the light emitting units 10 corresponding to the camera region R1 of the display panel is turned off, and another portion (for example, a light emitting unit 10-2) of the light emitting units 10 is turned on.

In detail, the light guide plate 11 may include two portions (for example, a portion P1 and a portion P2). One (for example, the portion P1) of the two portions is adjacent to a portion (for example, the light emitting unit 10-1) of the light emitting units 10, and the other (for example, the portion P2) of the two portions is adjacent to another portion (for example, the light emitting unit 10-2) of the light emitting units 10. In some embodiments, the portion P1 and the portion P2 may be integrally formed, that is, the portion P1 and the portion P2 are directly connected, and there is no obvious boundary or splicing interface between the two, but not limited thereto.

Since the light emitted by the light emitting units 10 has a divergence angle, in order to converge the light for the light entering the light guide plate 11 to proceed substantially straight (for example, proceed in a direction opposite to the first direction D1), the light guide plate 11 may include multiple strip-shaped microstructures 110. The strip-shaped microstructures 110 may be triangular pillar structures and may extend along the main transmission direction (for example, the direction opposite to the first direction D1) of the light emitted from the light emitting units 10 to the light guide plate 11, and the strip-shaped microstructures 110 may be arranged in the second direction D2. In some embodiments, at least portion of the triangular pillars among the strip-shaped microstructures 110 may have an angle θ within a range of 85 degrees to 95 degrees. For example, the angle θ may be 90 degrees, but not limited thereto.

The strip-shaped microstructures 110 may be disposed on the top surface ST, and when viewed from the top view, the strip-shaped microstructures 110 are located outside the camera region R1, that is, the strip-shaped microstructures 110 do not overlap with the camera region R1 in the third direction D3. For example, the strip-shaped microstructures 110 may overlap with the display region R2 in the third direction D3. In some embodiments, the display device may further include a non-visible light sensor (not shown), such as an infrared light sensor for facial recognition, but not limited thereto. The display device DD may further include a visible light sensing region R3 corresponding to the non-visible light sensor, and when viewed from the top view, the strip-shaped microstructures 110 may be located in a region outside the non-visible light sensing region R3 to reduce the influence on the non-visible light sensing result.

In the display mode, as shown in FIG. 2A, through turning on all the light emitting units 10, the portion P1 and the portion P2 are all lit, so the camera region R1, the display region R2, and the non-visible light sensing region R3 may jointly display an image. In the camera mode, through turning off the light emitting unit 10-1 corresponding to the camera region R1 and turning on the remaining light emitting units (for example, the light emitting unit 10-2), the portion P1 is not lit and the portion P2 is lit, so that the interference (for example, overexposure) of the light emitted by the light emitting unit 10-1 on image capturing quality may be reduced. At the same time, the portion P2 may still provide backlight for display, so the display region R2 overlapping with the portion P2 in the third direction D3 may still be used to display the image. In some embodiments, an optical film for filtering visible light may be disposed in the region on the top surface ST and overlapping with the non-visible light sensing region R3 in the third direction D3 to reduce the interference of the light emitted by the light emitting unit 10-2 on the non-visible light sensor.

Taking the architecture of FIG. 1 as an example, when the display device DD is operating in the camera mode, the tunable diffuser 13 and the tunable reflector 12 in the camera region R1 are both switched to the transparent state, and the light emitting unit 10-1 corresponding to the camera region R1 is turned off (as shown in FIG. 2B), so that the camera 5 may obtain an image of the captured object. On the other hand, the tunable diffuser 13 in the display region R2 is switched to the scattered state, the tunable reflector 12 in the display region R2 is switched to the reflective state, and the light emitting unit 10-2 corresponding to the display region R2 is turned on, so that at least portion of the display region R2 may still be used to display the image in the camera mode. When the display device DD is operating in the display mode, in the camera region R1 and the display region R2, the tunable diffuser 13 is switched to the scattered state, the tunable reflector 12 is switched to the reflective state, and the light emitting units 10 are all turned on (as shown in FIG. 2A), that is, the camera region R1 and display region R2 may be used to jointly display the image.

In the following embodiments, the same or similar elements will adopt the same or similar reference numerals, and redundant descriptions thereof will be omitted. In addition, the features in different embodiments may all be arbitrarily mixed and matched as long as there is no violation to the spirit of the disclosure or conflict, and simple equivalent changes and modifications made in accordance with the specification or claims are still within the scope of this disclosure.

FIG. 3 to FIG. 7 are respectively other types of schematic top views of the light guide plate and the light emitting units in the camera mode according to the disclosure. The light guide plate and the light emitting units shown in FIG. 3 to FIG. 7 may also be applied to the embodiment of FIG. 1.

Figure 3:
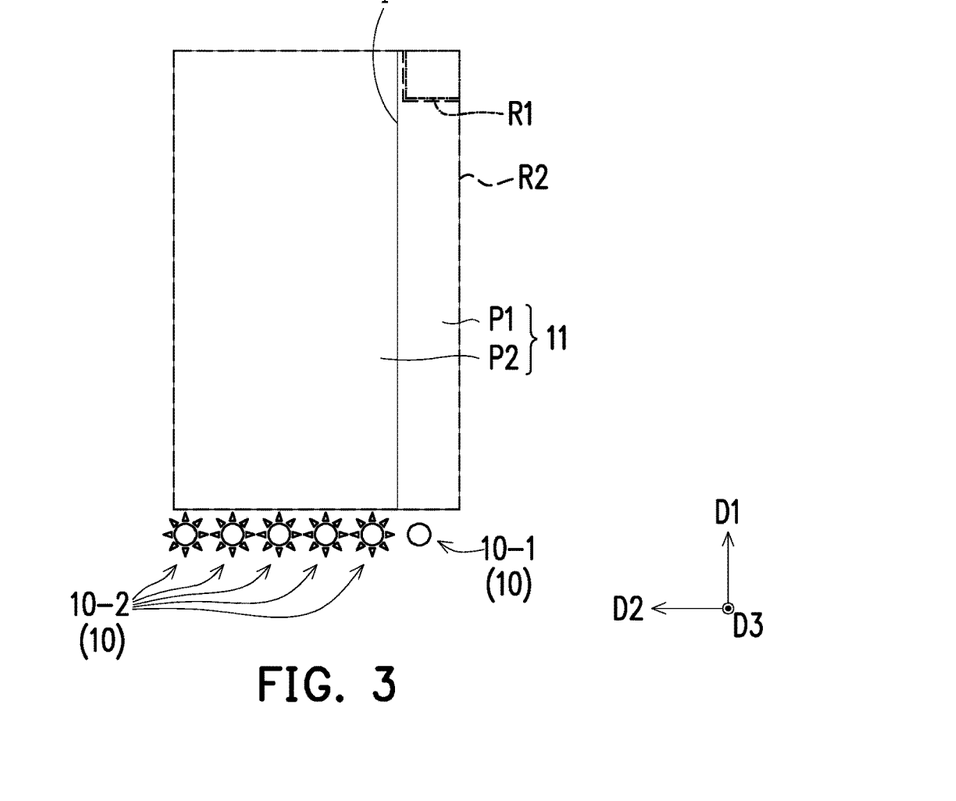
FIG. 3 to FIG. 7 are respectively other types of schematic top views of the light guide plate and the light emitting units in the camera mode according to the disclosure.

In some embodiments, as shown in FIG. 3, the portion P1 and the portion P2 may be arranged in the second direction D2 and may extend in the first direction D1. From the top view, the light emitting unit 10-1 and the camera region R1 may be respectively located on opposite sides of the portion P1, and the light emitting unit 10-2 and the light emitting unit 10-1 may be arrange on the same side of the light guide plate 11 in the second direction D2.

The portion P1 and the portion P2 may be separated from each other. For example, at a boundary I of the portion P1 and the portion P2, there may be one of a gap (for example, an air gap), a reflective layer, and an absorbing layer. Through forming one of the gap, the reflective layer, and the absorbing layer at the boundary I of the portion P1 and the portion P2, the light transmitted in the portion P2 entering the portion P1 may be reduced. Therefore, when the backlight module is operating in the camera mode, the interference of the light emitted by the light emitting unit 10-2 on image capturing quality may be reduced. In addition, under the structure where the portion P1 and the portion P2 are separated from each other, the light guide plate 11 does not need to include the strip-shaped microstructures 110 (refer to FIG. 2A or FIG. 2B), and the light guide plate 11 may optionally include the dots (not shown) disposed on the bottom surface SB (refer to FIG. 2A or FIG. 2B). The following embodiments may be changed accordingly, which will not be described in detail below.

Figure 4:
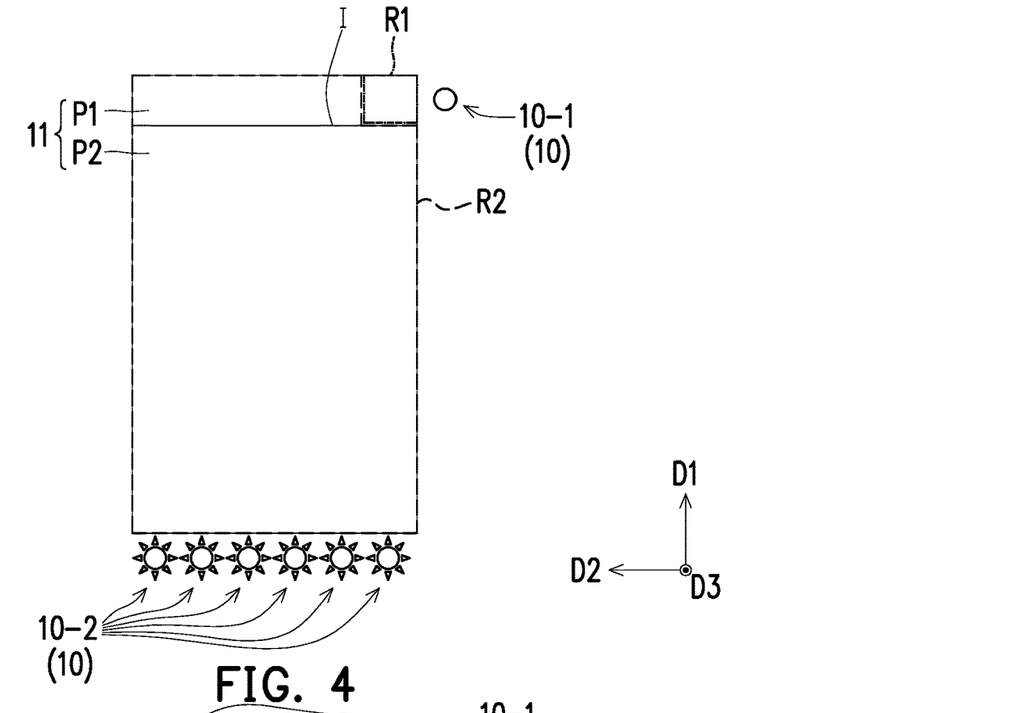

In some embodiments, as shown in FIG. 4, the portion P1 and the portion P2 may be arranged in the first direction D1 and may extend in the second direction D2. From the top view, the light emitting unit 10-1 and the camera region R1 may be located on the same side of the portion P1, and the light emitting unit 10-2 and the light emitting unit 10-1 may be respectively located on two adjacent sides of the light guide plate 11.

Figure 5:
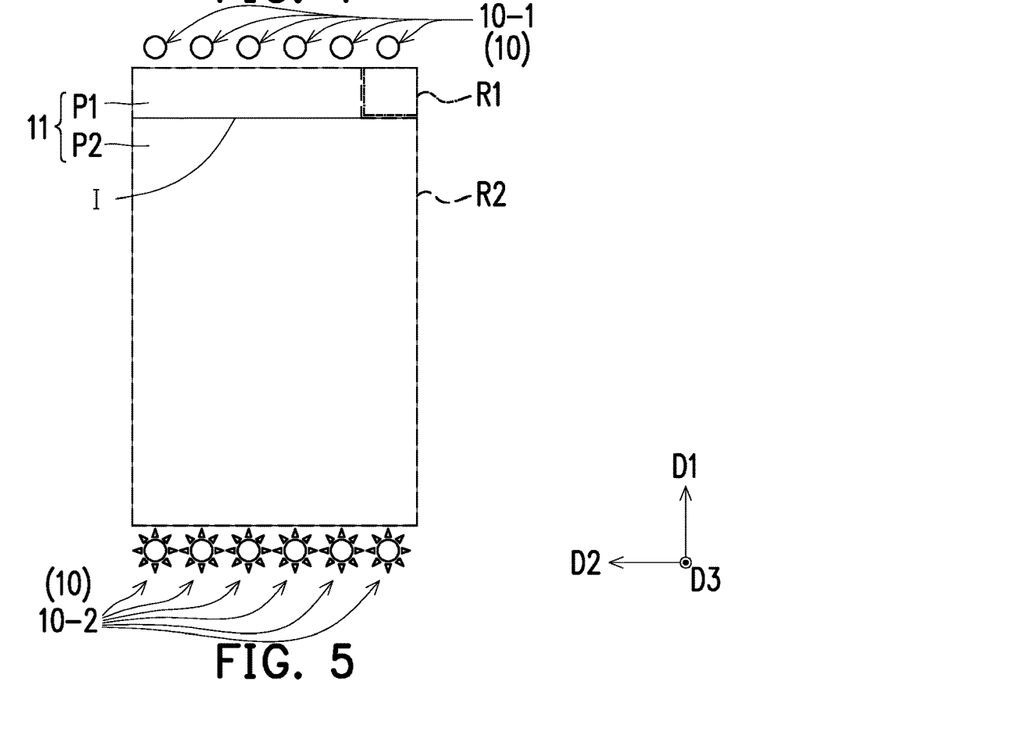

In some embodiments, as shown in FIG. 5, the portion P1 and the portion P2 may be arranged in the first direction D1 and may extend in the second direction D2. From the top view, the light emitting unit 10-2 and the light emitting unit 10-1 may be respectively located on opposite sides of the light guide plate 11 and each arranged in the second direction D2.

Figure 6:
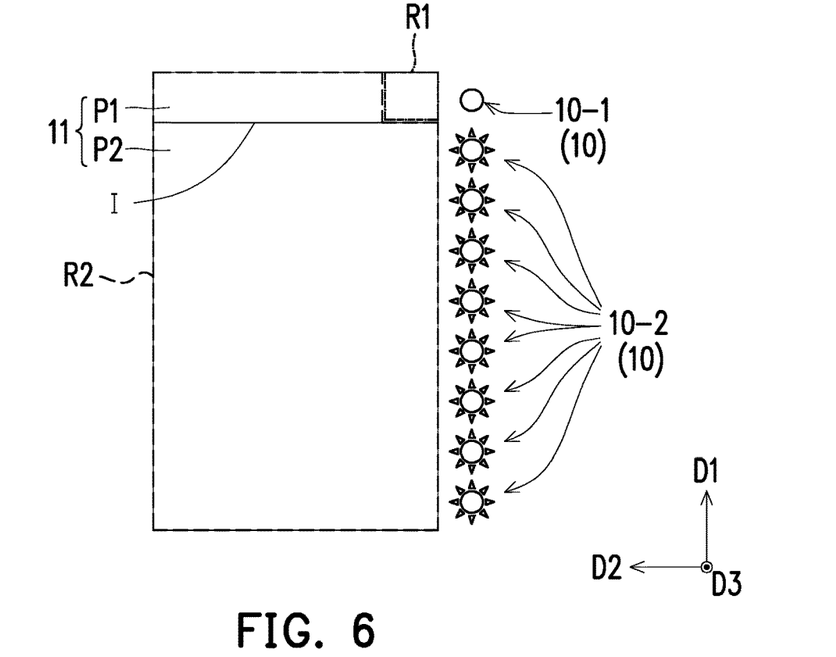

In some embodiments, as shown in FIG. 6, the portion P1 and the portion P2 may be arranged in the first direction D1 and may extend in the second direction D2. From the top view, the light emitting unit 10-1 and the camera region R1 may be located on the same side of the portion P1, and the light emitting unit 10-2 and the light emitting unit 10-1 may be arranged on the same side of the light guide plate 11 in the first direction D1.

Figure 7:
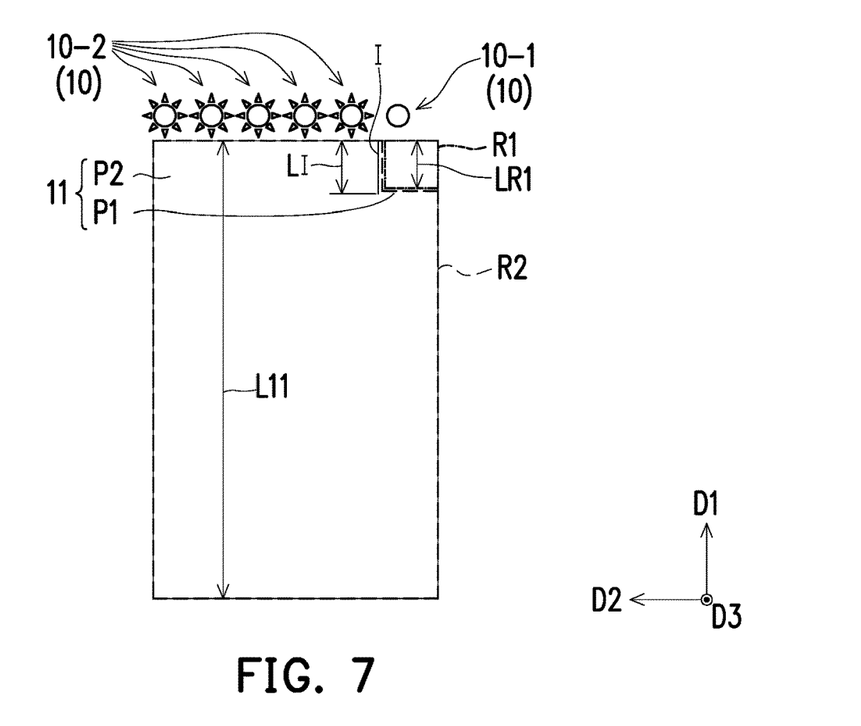

In some embodiments, as shown in FIG. 7, the light emitting unit 10-2 and the light emitting unit 10-1 may be arrange on one side of the light guide plate 11 and adjacent to the camera region R1 in the second direction D2, and the boundary I may extend from the side of the light guide plate 11 into the light guide plate 11. A length LI of the boundary I in the first direction D1 may be substantially equal to a length LR1 of the camera region R1 in the first direction D1 and less than a length L11 of the light guide plate 11 in the first direction D1.

Figure 8:
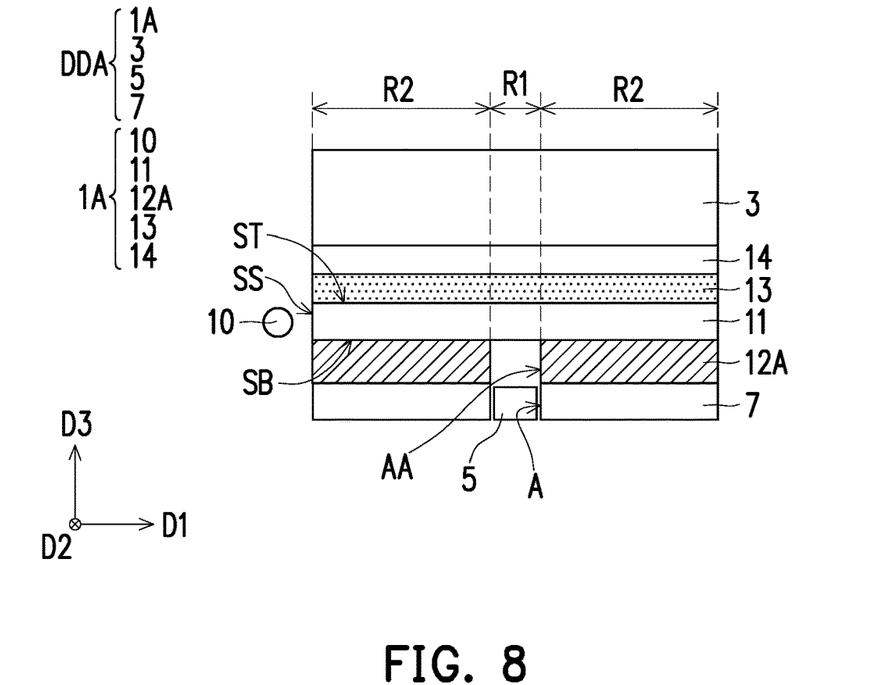
FIG. 8 is a schematic cross-sectional view of a backlight module according to a second embodiment of the disclosure.

FIG. 8 is a schematic cross-sectional view of a backlight module according to a second embodiment of the disclosure. Please refer to FIG. 8. The difference between a display device DDA and the display device DD of FIG. 1 is described as follows. In the display device DDA, a backlight module 1A replaces the tunable reflector 12 with a reflective sheet 12A. The material of the reflective sheet 12A may include metal or other materials with reflective properties. The reflective sheet 12A includes an opening AA. The opening AA corresponds to the camera region R1 in the third direction D3, so that the image beam can be transmitted to the camera 5 through the opening AA. In some embodiments, the reflective sheet 12A is thin enough, and the aperture range of the opening AA is 1 mm to 3 mm.

Under the architecture of FIG. 8, when the display device DDA is operating in the camera mode, in the camera region R1, the tunable diffuser 13 is switched to the transparent state and the light emitting unit (refer to the light emitting unit 10-1 of FIG. 2B to FIG. 7) corresponding to the camera region R1 is turned off, so that the camera 5 may obtain an image of the capture object. On the other hand, in the display region R2, the tunable diffuser 13 is switched to the scattered state, and the light emitting unit (refer to the light emitting unit 10-2 of FIG. 2B to FIG. 7) corresponding to the display region R2 is turned on, so that at least portion of the display region R2 may still display the image. When the display device DDA is operating in the display mode, in the camera region R1 and the display region R2, the tunable diffuser 13 is switched to the scattered state, and the light emitting units 10 are all turned on, that is, the camera region R1 and the display region R2 may be jointly display the image.

Figure 9A:
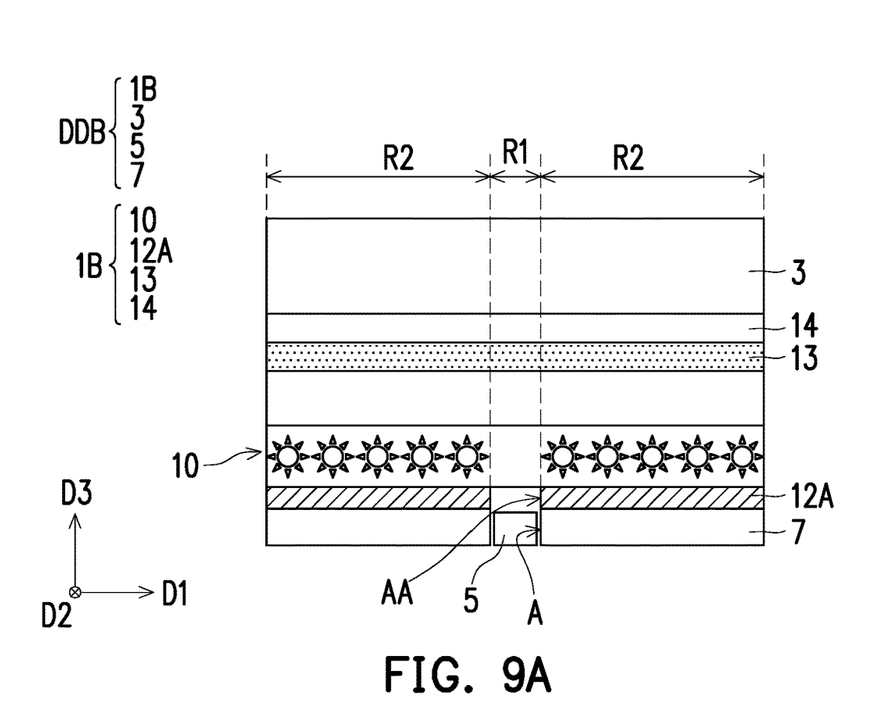
FIG. 9A and FIG. 9B are respectively schematic cross-sectional views of a backlight module in a display mode and a camera mode according to a third embodiment of the disclosure.
Figure 9B:
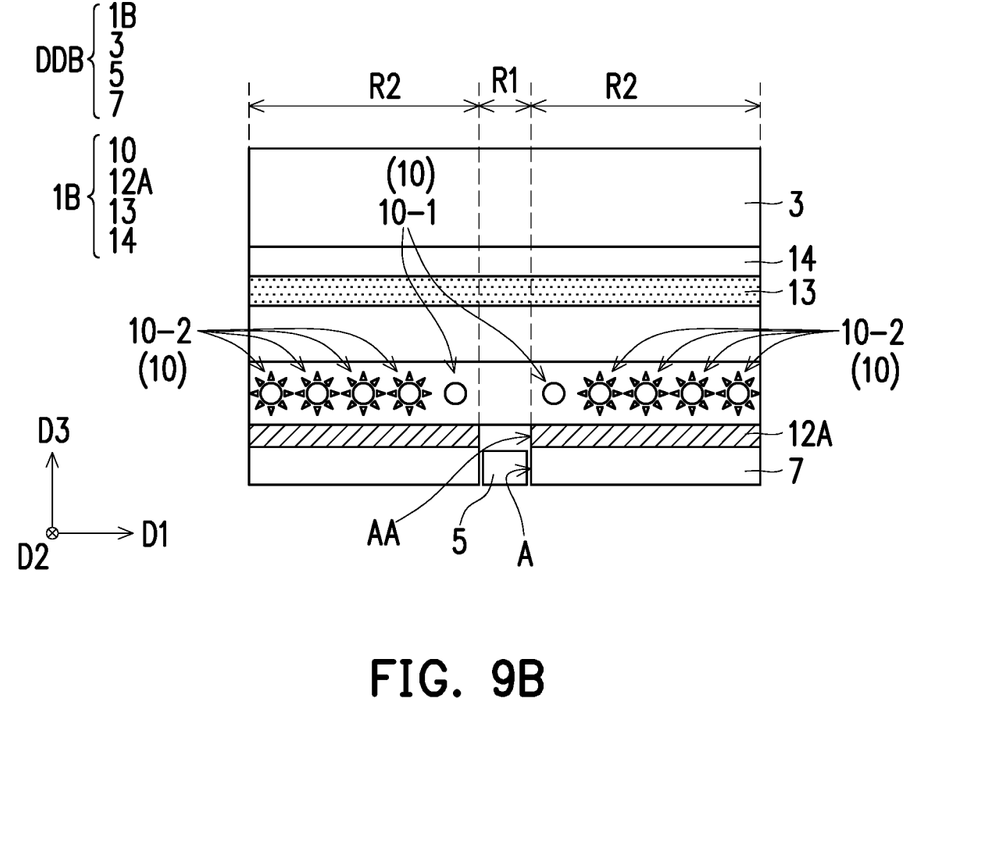

FIG. 9A and FIG. 9B are respectively schematic cross-sectional views of a backlight module in a display mode and a camera mode according to a third embodiment of the disclosure. Please refer to FIG. 9A and FIG. 9B. The difference between a display device DDB and the display device DDA of FIG. 8 is described as follows. In the display device DDB, a backlight module 1B is a direct-type backlight module. Specifically, the backlight module 1B may include the light emitting units 10, the reflective sheet 12A, the tunable diffuser 13, and the optical element layer 14, but may not include the light guide plate 11. The light emitting units 10 are arranged overlapping with the tunable diffuser 13 in the third direction D3. When the backlight module is operating in the display mode, as shown in FIG. 9A, the light emitting units 10 are all turned on, and the tunable diffuser 13 is switched to the scattered state. When the backlight module is operating in the camera mode, as shown in FIG. 9B, the tunable diffuser 13 in the camera region R1 is switched to the transparent state, and a portion of the light emitting units 10 (for example, the light emitting unit 10-1 adjacent to the camera region R1) corresponding to the camera region R1 of the display panel is turned off. On the other hand, the tunable diffuser 13 in the display region R2 is switched to the scattered state, and another portion of the light emitting units 10 (for example, the light emitting unit 10-2) is turned on.

In the display mode, through turning on all the light emitting units 10, the camera region R1 and the display region R2 may be jointly used to display an image. In the camera mode, through turning off the light emitting unit 10-1 corresponding to the camera region R1 and turning on the remaining light emitting units (for example, the light emitting unit 10-2), the interference (for example, overexposure) of the light emitted by the light emitting unit 10-1 on image capturing quality may be reduced. At the same time, at least portion of the display region R2 may still be used to display the image.

In summary, in the embodiments of the disclosure, when the backlight module is operating in the display mode, through turning on the light emitting units, the camera region may also be used to display the image. When the backlight module is operating in the camera mode, through turning off the light emitting unit corresponding to the camera region and turning on the remaining light emitting units, the interference on image capturing quality may be reduced. At the same time, at least portion of the light emitting units may still be used to provide the light for display. In some embodiments, the backlight module may be an edge-type backlight module, and the backlight module may further include the light guide plate. In some embodiments, the strip-shaped microstructures may be formed on the two portions of the light guide plate or the two portions may be separated from each other, so that the light entering the light guide plate generally proceeds in a straight line, and combined with the manner of regionalized lighting, the requirements of the display mode and the camera mode are met at the same time. In some embodiments, the backlight module may also be a direct-type backlight module. In some embodiments, the backlight module may further include the tunable reflector or the tunable diffuser, and through switching the state of the tunable reflector or the tunable diffuser, the interference of the tunable reflector or the tunable diffuser on image capturing quality is reduced or image capturing quality is improved.

The above embodiments are only used to illustrate, but not to limit, the technical solutions of the disclosure. Although the disclosure has been described in detail with reference to the above embodiments, persons skilled in the art should understand that they may still modify the technical solutions described in the above embodiments or equivalently replace some or all of the technical features. However, the modifications or replacements do not cause the essence of the corresponding technical solution to deviate from the scope of the technical solutions of the embodiments of the disclosure.

Although the embodiments of the disclosure and the advantages thereof have been disclosed as above, it should be understood that persons skilled in the art may make changes, substitutions, and modifications without departing from the spirit and scope of the disclosure, and the features between the embodiments may be arbitrarily mixed and replaced to form other new embodiments. In addition, the protection scope of the disclosure is not limited to the processes, machines, manufacturing, material composition, devices, methods, and steps in the specific embodiments described in the specification. Persons skilled in the art may understand from the content of the disclosure that the current or future-developed processes, machines, manufacturing, material composition, devices, methods, and steps may all be used according to the disclosure as long as they may implement substantially the same functions or obtain substantially the same results in the embodiments described herein. Therefore, the protection scope of the disclosure includes the processes, machines, manufacturing, material composition, devices, methods, and steps. In addition, each claim constitutes an individual embodiment, and the protection scope of the disclosure also includes the combination of each claim and embodiment. The protection scope of the disclosure shall be defined by the appended claims.

What is claimed is:

1. A backlight module, used for a display panel having a camera region and operating in a display mode or a camera mode, the backlight module comprising:
    a plurality of light emitting units, wherein
    when the backlight module is operating in the display mode, the light emitting units are all turned on, and when the backlight module is operating in the camera mode, a portion of the light emitting units corresponding to the camera region of the display panel is turned off, and another portion of the light emitting units is turned on, and
    wherein the backlight module is an edge-type backlight module, and the backlight module further comprises a light guide plate, the light guide plate comprises two portions, one of the two portions of the light guide plate is adjacent to the portion of the light emitting units, and the other one of the two portions of the light guide plate is adjacent to the another portion of the light emitting units.

2. The backlight module according to claim 1, wherein the two portions of the light guide plate are separated from each other.

3. The backlight module according to claim 1, wherein the light guide plate comprises a plurality of strip-shaped microstructures, and the strip-shaped microstructures extend along a main transmission direction of light emitted from the light emitting units to the light guide plate.

4. The backlight module according to claim 3, wherein at least a portion of the strip-shaped microstructures has an angle within a range of 85 degrees to 95 degrees.

5. A display device, comprising:
a display panel, having a camera region;
a backlight module, wherein the display panel is disposed on the backlight module, and the backlight module operates in a display mode or a camera mode, and the backlight module comprises:
a plurality of light emitting units, wherein
when the backlight module is operating in the display mode, the light emitting units are all turned on, and when the backlight module is operating in the camera mode, a portion of the light emitting units corresponding to the camera region of the display panel is turned off, and another portion of the light emitting units is turned on, and
wherein the backlight module is an edge-type backlight module, and the backlight module further comprises a light guide plate, the light guide plate comprises two portions, one of the two portions of the light guide plate is adjacent to the portion of the light emitting units, and the other one of the two portions of the light guide plate is adjacent to the another portion of the light emitting units; and
a camera, disposed under the backlight module and corresponding to the camera region.

6. The display device according to claim 5, wherein the two portions of the light guide plate are separated from each other.

7. The display device according to claim 5, wherein the light guide plate comprises a plurality of strip-shaped microstructures, and the strip-shaped microstructures extend along a main transmission direction of light emitted from the light emitting units to the light guide plate.

8. The display device according to claim 7, wherein at least a portion of the strip-shaped microstructures has an angle within a range of 85 degrees to 95 degrees.

9. The display device according to claim 5, wherein the backlight module further comprises a tunable reflector, and the tunable reflector is disposed between the light guide plate and the camera, wherein
when the backlight module is operating in the display mode, a portion of the tunable reflector overlapping with the camera region is in a reflective state, and when the backlight module is operating in the camera mode, the portion of the tunable reflector overlapping with the camera region is in a transparent state.

10. The display device according to claim 5, wherein the backlight module further comprises a reflective sheet, the reflective sheet comprises an opening, and the opening corresponds to the camera region.

11. The display device according to claim 5, wherein the backlight module further comprises a tunable diffuser, and the tunable diffuser is disposed under the display panel, wherein
when the backlight module is operating in the display mode, a portion of the tunable diffuser overlapping with the camera region is in a scattered state, and when the backlight module is operating in the camera mode, the portion of the tunable diffuser overlapping with the camera region is in a transparent state.

12. The display device according to claim 11, wherein the display panel further has a display region, wherein
when the backlight module is operating in any one of the display mode and the camera mode, the tunable diffuser overlapping with the display region is in the scattered state.

* * * * *